(12) United States Patent
Dokuni

(10) Patent No.: US 8,014,594 B2
(45) Date of Patent: Sep. 6, 2011

(54) IMAGE COLOR DISCRIMINATING APPARATUS, IMAGE COLOR DISCRIMINATING METHOD AND PROGRAM

(75) Inventor: Kenji Dokuni, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 861 days.

(21) Appl. No.: 12/039,636

(22) Filed: Feb. 28, 2008

(65) Prior Publication Data

US 2008/0240554 A1    Oct. 2, 2008

(30) Foreign Application Priority Data

Mar. 30, 2007   (JP) ................. 2007-090294

(51) Int. Cl.
*G06K 9/00*   (2006.01)
(52) U.S. Cl. ...................................... 382/162
(58) Field of Classification Search ............ 382/162, 382/164–167, 274; 358/518–520; 348/453; 345/600–605
See application file for complete search history.

(56) References Cited

U.S. PATENT DOCUMENTS

| 7,620,239 B2 * | 11/2009 | Minamino .................. 382/165 |
| 2006/0193513 A1 | 8/2006 | Minamino |

FOREIGN PATENT DOCUMENTS

| JP | 10-032722 | 2/1998 |
| JP | 10-040373 | 2/1998 |
| JP | 10-336466 | 12/1998 |
| JP | 2002-305665 | 10/2002 |
| JP | 2005-020413 | 1/2005 |
| JP | 2006203583 A | 8/2006 |
| JP | 2006203584 A | 8/2006 |
| JP | 2006238321 A | 9/2006 |
| JP | 2007-142804 | 6/2007 |

OTHER PUBLICATIONS

Japanese language office action and its English abstract for corresponding Japanese application 2007090294 lists the references above.

* cited by examiner

*Primary Examiner* — Jose Couso
(74) *Attorney, Agent, or Firm* — DLA Piper LLP (US)

(57) ABSTRACT

A method for discriminating a color of an object image. Whether unit data showing a color of a part of the object image corresponds to any position on a two-dimensional color plane is discriminated. A distribution value showing a width of a distribution range of the unit data in the color plane is acquired based on the discrimination result. Whether the object image corresponds to a full color image having mixed color expression, a specific color image not having mixed color expression or an achromatic color image is discriminated based on the distribution value.

22 Claims, 19 Drawing Sheets

IMAGE COLOR DISCRIMINATING APPARATUS, IMAGE COLOR DISCRIMINATING METHOD AND PROGRAM

CROSS-REFERENCE TO RELATED APPLICATIONS

This application claims priority under 35 U.S.C. 119 to Japanese Patent Application No. 2007-090294, filed on Mar. 30, 2007, which application is hereby incorporated by reference in its entirety.

BACKGROUND OF THE INVENTION

1. Field of the Invention

The present invention relates to a technique of discriminating a color of an image.

2. Description of the Related Art

A technique of automatically discriminating a kind of an image, that is, whether or not an object image is a chromatic color image or an achromatic color image, has been proposed. In a multifunction peripheral capable of reading a document and acquiring an image, the kind of image acquired is discriminated, and according to the kind of image, a processing method of the image is changed.

A chromatic color image includes a full color image having mixed color expression and a specific color image not having mixed color expression. However, conventional techniques only discrimination whether the image is a chromatic color image or an achromatic image. Therefore, a technique capable of discriminating the kind of image in detail is needed.

BRIEF SUMMARY OF THE INVENTION

The present invention addresses this problem and provides a technique that easily discriminates whether an object image is a full color image, a specific color image or an achromatic color image.

The present invention has several aspects. A first aspect of the present invention is an image color discriminating apparatus that discriminates the color of an object image. A unit discriminating part discriminates whether unit data showing the color of each part of the object image corresponds to any position on a two-dimensional color plane. A distribution value acquiring part acquires a distribution value showing a width of a distribution range of the unit data in the color plane, based on a discrimination result obtained by the unit discriminating part. An image discriminating part discriminates, based on the distribution value, whether the object image corresponds to a full color image having mixed color expression, a specific color image not having mixed color expression or an achromatic color image.

In another aspect of the present invention, the image discriminating part discriminates the object image to be a full color image when the distribution value is a prescribed first threshold value or more, and discriminates the object image to be an achromatic color image when the distribution value is under a prescribed second threshold value which is smaller than the first threshold value.

In another aspect of the present invention, the image discriminating part discriminates the object image to be a specific color image when the distribution value is not less than the aforementioned second threshold value and under the aforementioned first threshold value.

Another aspect of the present invention includes a hue histogram generator that generates a histogram of hue, based on the color shown by the unit data. The image discriminating part discriminates whether the object image corresponds to a full color image or a specific color image based on the hue histogram, when the distribution value is not less than the second threshold value and under the first threshold value.

Another aspect of the present invention includes a lightness histogram generation part that generates a histogram of a parameter of brightness, based on the color shown by the unit data. A discriminating part discriminates whether the object image corresponds to a gray-scale image having tone expression or a monochromatic image not having tone expression, based on the histogram of the parameter of brightness, when the object image is discriminated to be an achromatic color image.

In another aspect of the present invention, the unit discriminating part discriminates whether the unit data belongs to any of a plurality of partial areas obtained by dividing the color plane, and the distribution value acquiring part acquires the number of the partial areas discriminated to be the areas to which the unit data belongs, as the distribution value.

In another aspect of the present invention, the unit discriminating part discriminates whether the unit data belongs to any of the plurality of partial areas obtained by dividing the color plane, and the distribution acquiring part acquires a total area of the partial areas discriminated to be the areas to which the unit data belongs, as the distribution value.

In another aspect of the present invention, the distribution value acquiring part acquires distribution values only for partial areas having a number of unit data equaling or exceeding a prescribed threshold value.

Still another aspect of the present invention provides an image color discriminating method for discriminating the color of an object image. The method includes the steps of: (a) discriminating whether unit data showing the color of a part of the object image corresponds to any position on the two-dimensional color plane; (b) acquiring a distribution value showing a width of a distribution range of the unit data in the color plane, based on the discrimination result obtained in step (a); and (c) discriminating based on the distribution value whether the object image corresponds to a full color image having mixed color expression, a specific color image not having mixed color expression or an achromatic color image.

Still another aspect of the present invention provides a program embodied in a computer readable medium for discriminating a color of an object image. The program causes a computer to execute the steps of: (a) discriminating whether unit data showing the color of a part of the object image corresponds to any position on a two-dimensional color plane; (b) acquiring a distribution value showing a width of a distribution range of the unit data in the color plane, based on a discrimination result of step (a); and (c) discriminating based on the distribution value whether the object image corresponds to any of a full color image having mixed color expression, a specific color image not having mixed color expression or an achromatic color image.

According to the present invention, the kind of object image is discriminated based on the width of the distribution range of the unit data in the color plane. Therefore, whether the object image corresponds to a full color image, specific color image or an achromatic color image is easily discriminated.

Further, according to the present invention, a full color image and an achromatic color image are easily discriminated. Generally, the distribution value in the specific color image is larger than the distribution value of the achromatic color image. Therefore, this point is focused on, and based on the distribution value (width of the distribution range), the full color image and the achromatic color image are discriminated. Therefore, discrimination with high accuracy can be performed with a simple processing.

Still further, according to the present invention, a specific color image is easily discriminated.

Still further, according to the present invention, a specific color image is accurately discriminated.

Still further, according to the present invention, the properties of an achromatic color image are discriminated in further detail.

Still further, according to the present invention, the width of the distribution range of the unit data in the color plane is easily acquired.

Still further, according to the present invention, the width of the distribution range of the unit data in the color plane is accurately acquired.

Still further, according to the present invention, influence of noise is reduced and accurate discrimination is performed.

Other features, elements, processes, steps, characteristics and advantages of the present invention will become more apparent from the following detailed description of embodiments of the present invention with reference to the attached drawings.

DETAILED DESCRIPTION OF PREFERRED EMBODIMENTS

Embodiments of the present invention are now explained with reference to the drawings.

1. First Embodiment 1-1. Regarding an Image that can be Discriminated

In an image color discriminating apparatus according to an embodiment of the present invention, a kind of an image to be processed is discriminated. Full color and specific color images are examples of chromatic color images that can be discriminated, and gray-scale and monochromatic images are examples of achromatic color images that can be discriminated. Each of these kinds of images is now explained.

A full color image is a chromatic color image having mixed color expression. For example, an image obtained by reading a document including a color photograph in general is a chromatic color image.

A specific color image is a chromatic color image that does not have mixed color expression. More specifically, a specific color image is made of one or a plurality of specific colors only, including at least one chromatic color, and does not have any mixed colors obtained by mixing specific colors. For example, an image obtained by reading a document made of a character of C (cyan) and a character of black only is a specific color image. Usually, a specific color is one of the three primary colors of C (cyan), M (magenta) and Y (yellow), or one of the primary colors of light of R (red), G (green) and B (blue). Therefore, the number of specific colors included in one specific color image is usually 6 or less.

A gray-scale image is an achromatic color image having tone expression. For example, an image obtained by reading a document including an achromatic color photograph having general tone variation is an achromatic color image.

A monochromatic image is an achromatic color image without tone expression, which can be represented only by two values such as black and white. For example, an image obtained by reading a document made of the character of black is a monochromatic image.

When unit data showing the color of each part of an image is plotted in a two-dimensional color plane such as a chromaticity diagram of the Lab colormetric system, the distribution range of the unit data (distribution range of a position where the unit data is plotted) has different characteristics, respectively, when an object image is a full color image, a specific color image and an achromatic color image.

Figure 1:
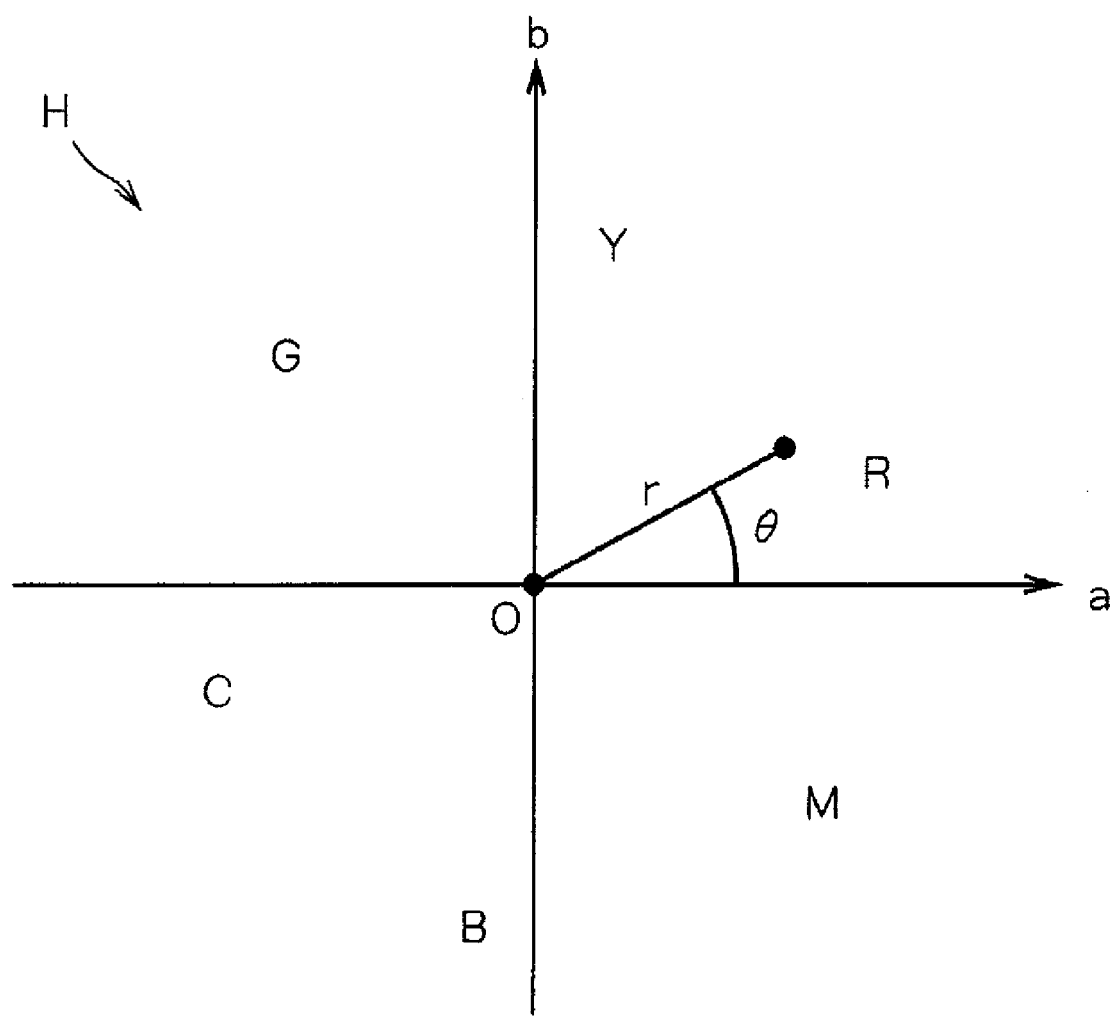
FIG. 1 is a diagram of an exemplary color plane.

FIG. 1 is an example of a color plane H, corresponding to a chromaticity diagram of the Lab colormetric system. In the Lab colormetric system, lightness is shown by L, and chromaticity showing hue and saturation is expressed by a and b. In the color plane H, an orthogonal two-dimensional coordinate system is set, wherein the horizontal axis is represented by a, and the vertical axis is represented by b. The lightness L corresponds to an axis in a direction orthogonal to a paper surface at a position of an original point O of the color plane H, and is not expressed on the color plane H.

Each color is radially arranged around the original point O in the color plane H. In the color plane H of FIG. 1, approximate positions corresponding to the six colors C (cyan), M (magenta), Y (yellow), R (red), G (green) and B (blue) are shown by their symbols (C, M, Y, R, G, B). In color plane H, a direction from the original point O (angle θ from a coordinate axis) indicates the hue, and a distance r from the original point O indicates the saturation. Accordingly, the saturation is higher when farther from the original point O, and an approximately achromatic color is shown at a position of the original point O and in the vicinity of the original point O.

Figure 2:
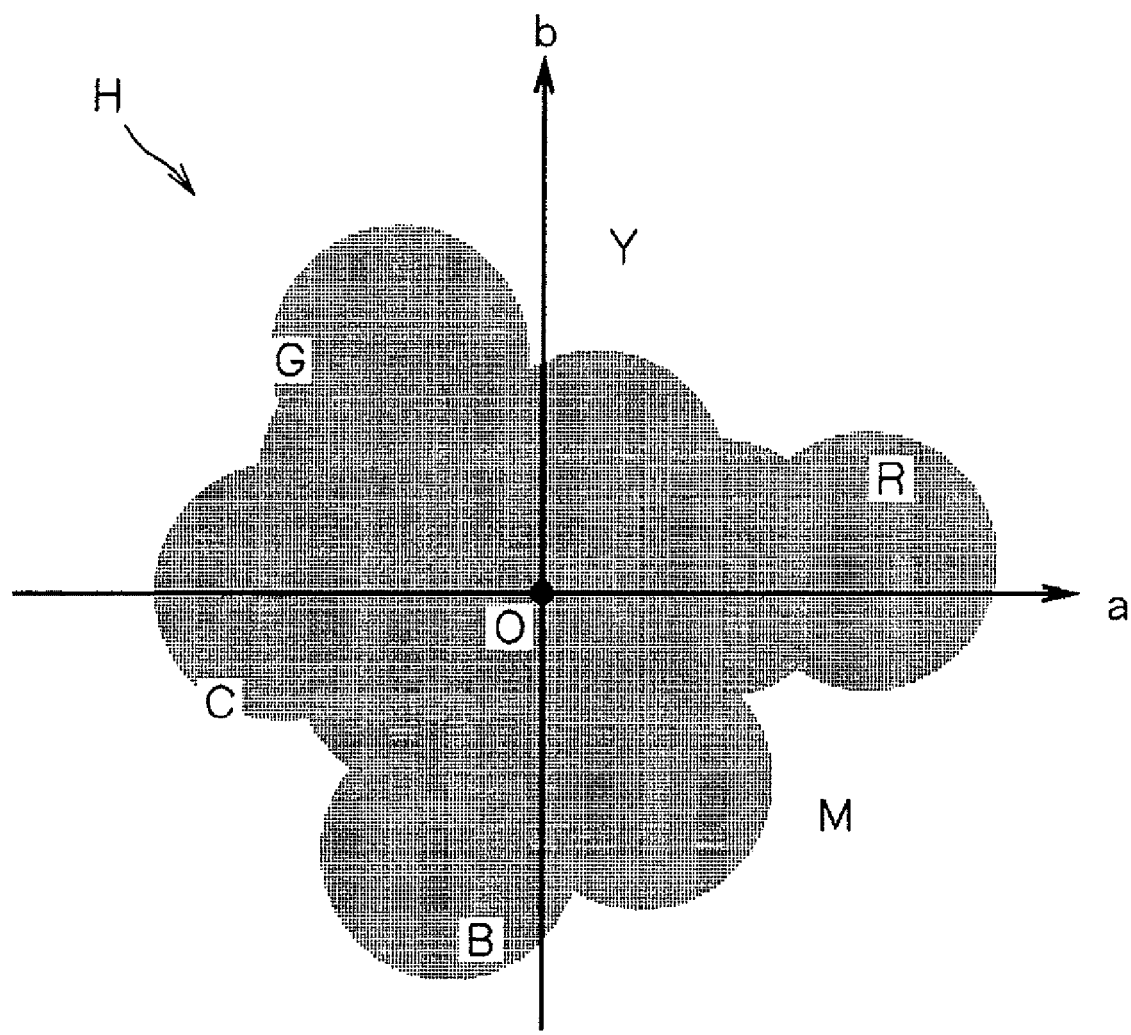
FIG. 2 illustrates exemplary unit data of a full color image plotted in the color plane.
Figure 3:
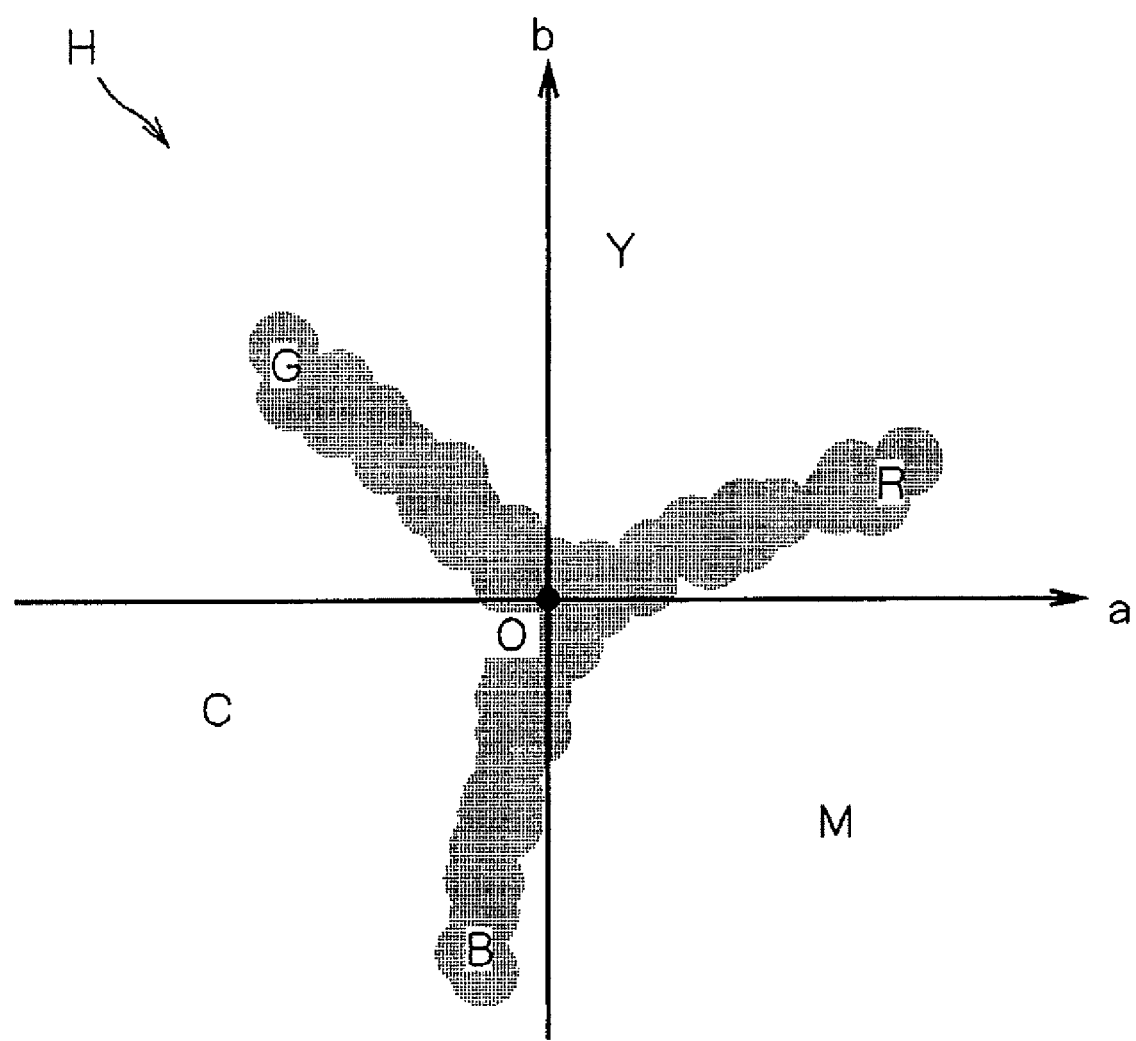
FIG. 3 illustrates exemplary unit data of a specific color image plotted in the color plane.
Figure 4:
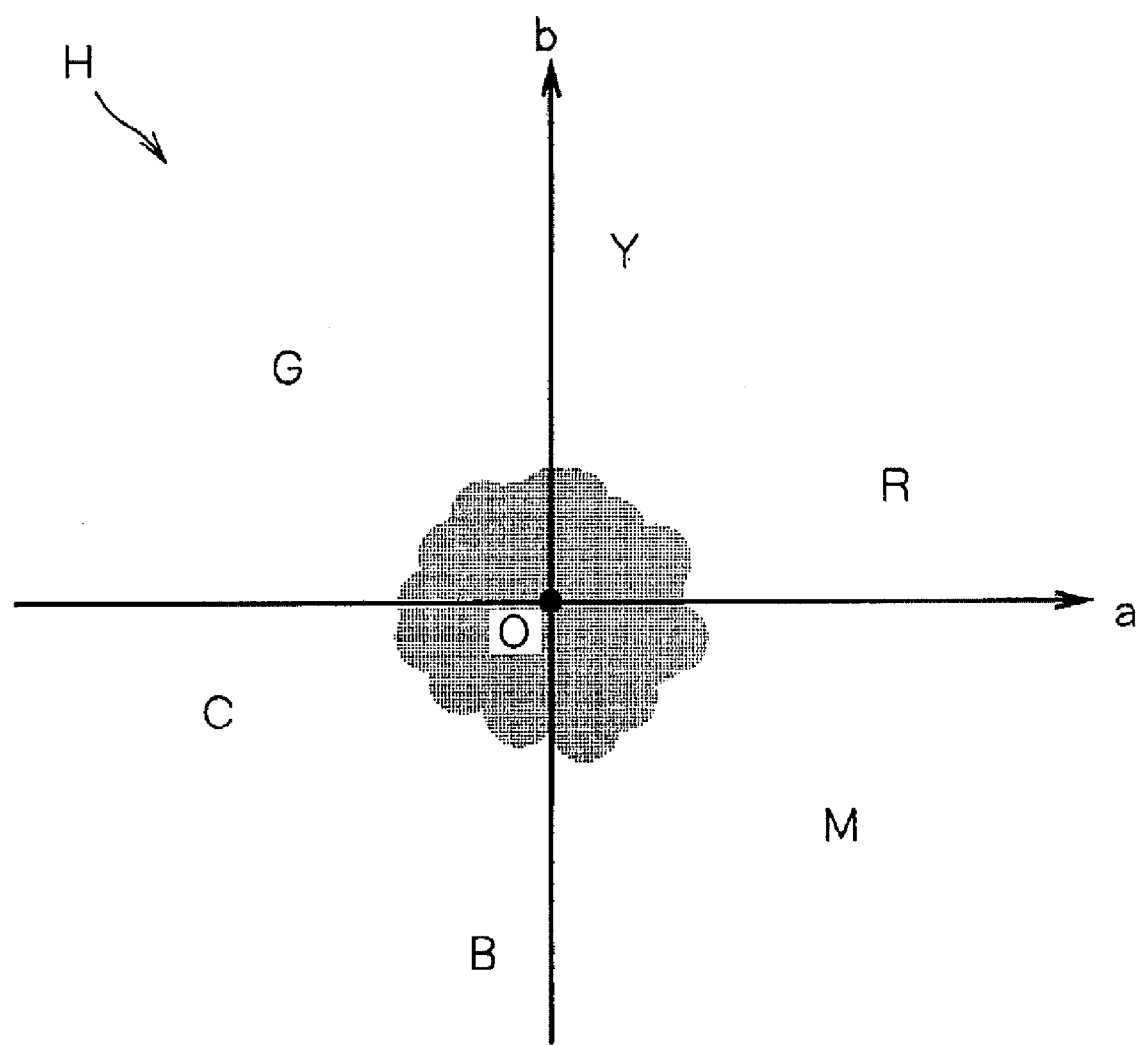
FIG. 4 illustrates exemplary unit data of an achromatic color image plotted in the color plane.

FIGS. 2-4 show, respectively, unit data of a full color image, a specific color image and an achromatic color image plotted in the color plane H. In FIGS. 2-4, the distribution range of the unit data is expressed by hatching.

As shown in FIG. 2, in a full color image, the unit data is distributed in a relatively wider range of the color plane H. There is almost no partial hue in the distribution range.

Meanwhile, as shown in FIG. 3, in a specific color image, the unit data is centralized in a direction of the hue corresponding to the specific color. FIG. 3 shows a specific color image with specific colors of R, G and B taken as an example. Therefore, the unit data is centralized in directions corresponding to R, G and B.

As shown in FIG. 4, the unit data of an achromatic color image is distributed in a relatively narrower range in the vicinity of the original point O.

Thus, the width of distribution ranges of unit data of full color, specific color and achromatic color images is different. Accordingly, full color, specific color and achromatic color images can be discriminated based on the width of the distribution range. An image color discriminating apparatus according to an embodiment of the present invention in which the kind of image is discriminated using the aforementioned principle is now explained.

1-2. Apparatus Structure

Figure 5:
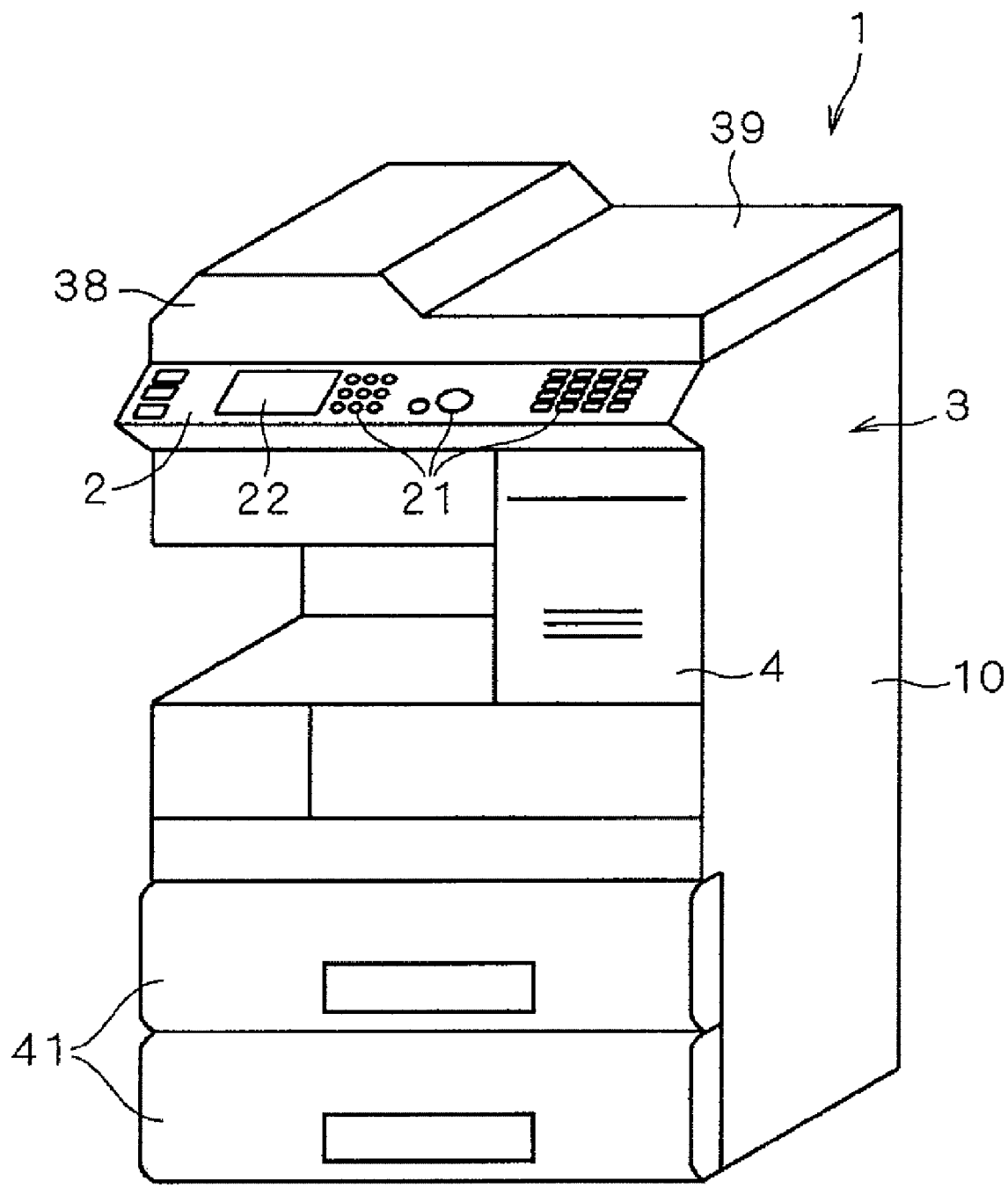
FIG. 5 is a perspective view of a multifunction peripheral according to a first embodiment of the invention.

FIG. 5 is a perspective view of a multifunction peripheral 1, which is an image color discriminating apparatus according to an embodiment of the present invention. Multifunction peripheral 1 is also called a "MFP apparatus" and has a plurality of functions such as facsimile, copy, scan and print functions.

The facsimile function transmits and receives an image to and from an opposite apparatus via a public telephone switching network and a network. The copy function reads a document and acquires an image, prints the image on recording paper and copies a content of the document. The scan function reads a document and acquires and stores an image. The print function prints an image on recording paper.

As shown in FIG. 5, the multifunction peripheral 1 includes a body part 10 and a cover of a book platen 39 that can be opened/closed with respect to the body part 10 and has an ADF 38. An operation panel 2, which is a user interface, is disposed on a front side of an upper part of the body part 10. The operation panel 2 includes an operation part 21 made of a plurality of switches that can be operated by a user and a displayer 22 made of a liquid crystal display for displaying each kind of information. The displayer 22 may also have a touch panel and receive a user operation. That is, user operations such as an input of commands and data may be received by the entire body of the operation panel 2.

A scanner section 3 for reading a document is disposed in an upper part of the body part 10. Scanner section 3 reads a document and acquires a document image showing the content of the document for the facsimile, copy and print functions. A line sensor including a CCD and the like is disposed in the scanner section 3. A reading system of the scanner section 3 includes FBS and ADF reading systems. The FBS reading system reads the content of a document placed on contact glass under the cover of the book platen 39 with the line sensor. The ADF reading system automatically takes in a bundle of documents having a plurality of sheets one by one, and continuously reads this document with the line sensor. The line sensor is disposed to acquire R (red), G (green) and B (blue) image data. Thus, an image with each pixel expressed by R, G and B is acquired in the scanner section 3.

A printer section 4 for printing on recording paper is disposed inside of the body part 10. The printer section 4 has a printing mechanism of an electrophotographic system and prints on recording paper based on the image to be printed. Recording paper is fed from a paper feeder 41 disposed in a lower part of the printer section 4. Toners of four colors such as C (cyan), M (magenta), Y (yellow) and K (black) are used as color materials for printing in printer section 4.

Figure 6:
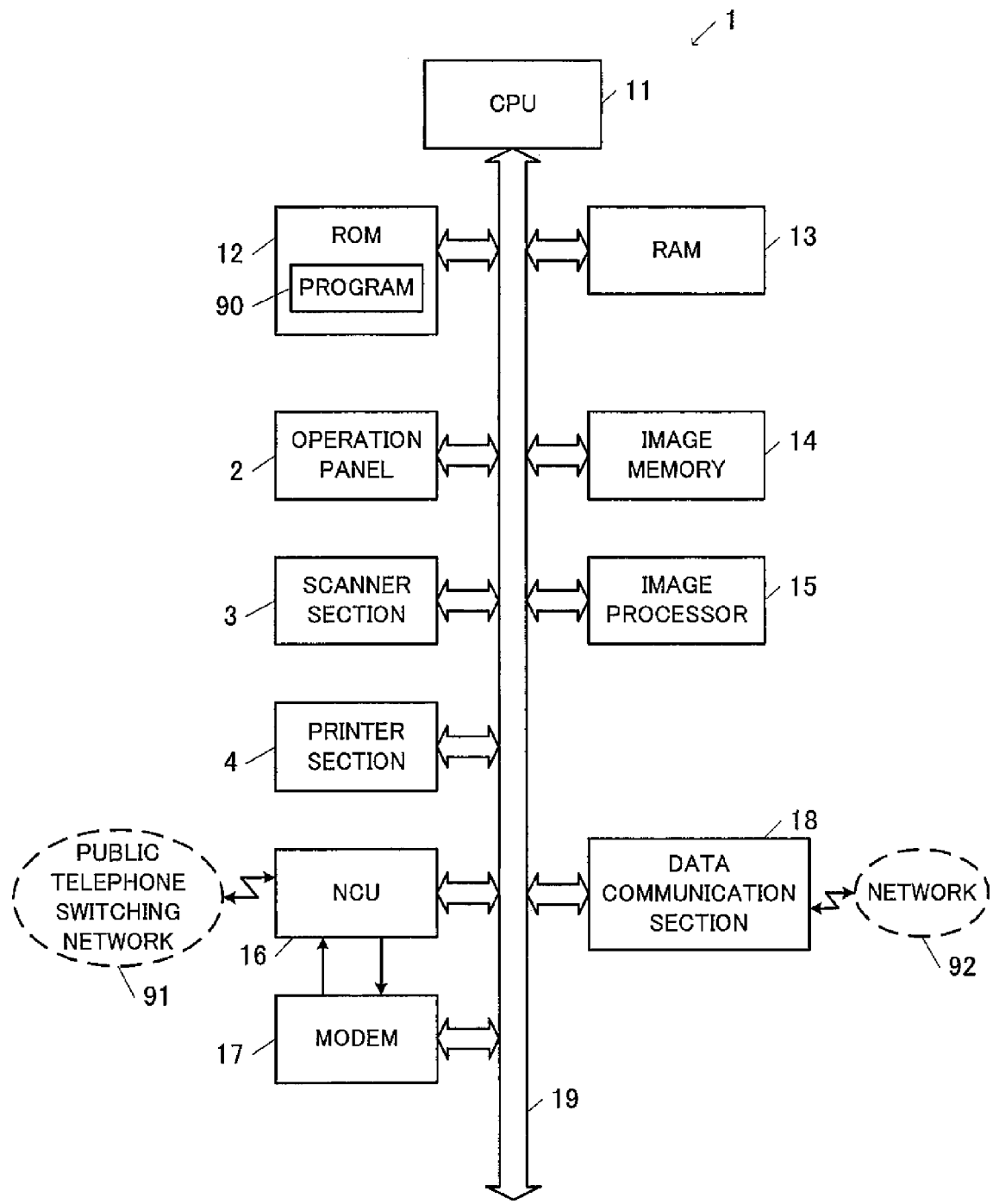
FIG. 6 is a block diagram of an internal structure of the multifunction peripheral.

FIG. 6 is a block diagram of an internal structure of the multifunction peripheral 1. As shown in FIG. 6, a computer for controlling the apparatus is built in the multifunction peripheral 1. More specifically, the multifunction peripheral 1 includes a CPU 11, a ROM 12 and a RAM 13. A program 90 as firmware is stored in the ROM 12, and in accordance with program 90, the CPU 11 as a main controller performs an arithmetic process, thus realizing each function for controlling each part of the multifunction peripheral 1. The RAM 13 is used as a work area for the arithmetic process of the CPU 11.

Program 90 is previously stored in the ROM 12. However, a new program 90 can also be read from a recording medium, or downloaded from an external server via a network 92, and stored in the ROM 12.

The CPU 11 is electrically connected via a bus line 19 to and controls each part of the multifunction peripheral 1, such as the operation panel 2, the scanner section 3 and the printer section 4. In addition, a user operation received by the operation panel 2 is inputted in the CPU 11 as a signal, and thus the multifunction peripheral 1 performs an operation according to the user operation.

The multifunction peripheral 1 further includes an image memory 14, an image processor 15, an NCU 16, a modem 17 and a data communication section 18.

The image memory 14 is a nonvolatile storage apparatus made of a hard disc and a flash memory. Images obtained by the scanner section 3 and received by facsimile communication are stored in the image memory 14.

The image processor 15 is a hardware circuit for applying prescribed processing to an image to be processed, such as images obtained by the scanner section 3 and printed by the printer section 4.

The NCU 16 and the modem 17 are processors realizing the facsimile function via a public telephone switching network 91. That is, the NCU 16 is the hardware circuit for performing operations such as opening/closing a DC loop of an analogue public telephone switching network, so that the modem 17 is connected to the public telephone switching network as needed. The modem 17 modulates and demodulates image data for facsimile communication.

The data communication section 18 is an interface for performing communication via a network 92 such as the Internet or LAN. Data communication section 18 realizes a data communication function with an external apparatus connected to the network 92 and a communication function as an internet facsimile device.

Each part of image memory 14, image processor 15, NCU 16, modem 17 and data communication section 18 is electrically connected to and operated under the control of the CPU 11 via the bus line 19.

1-3, Basic Operation of the Scanner Function

Figure 7:
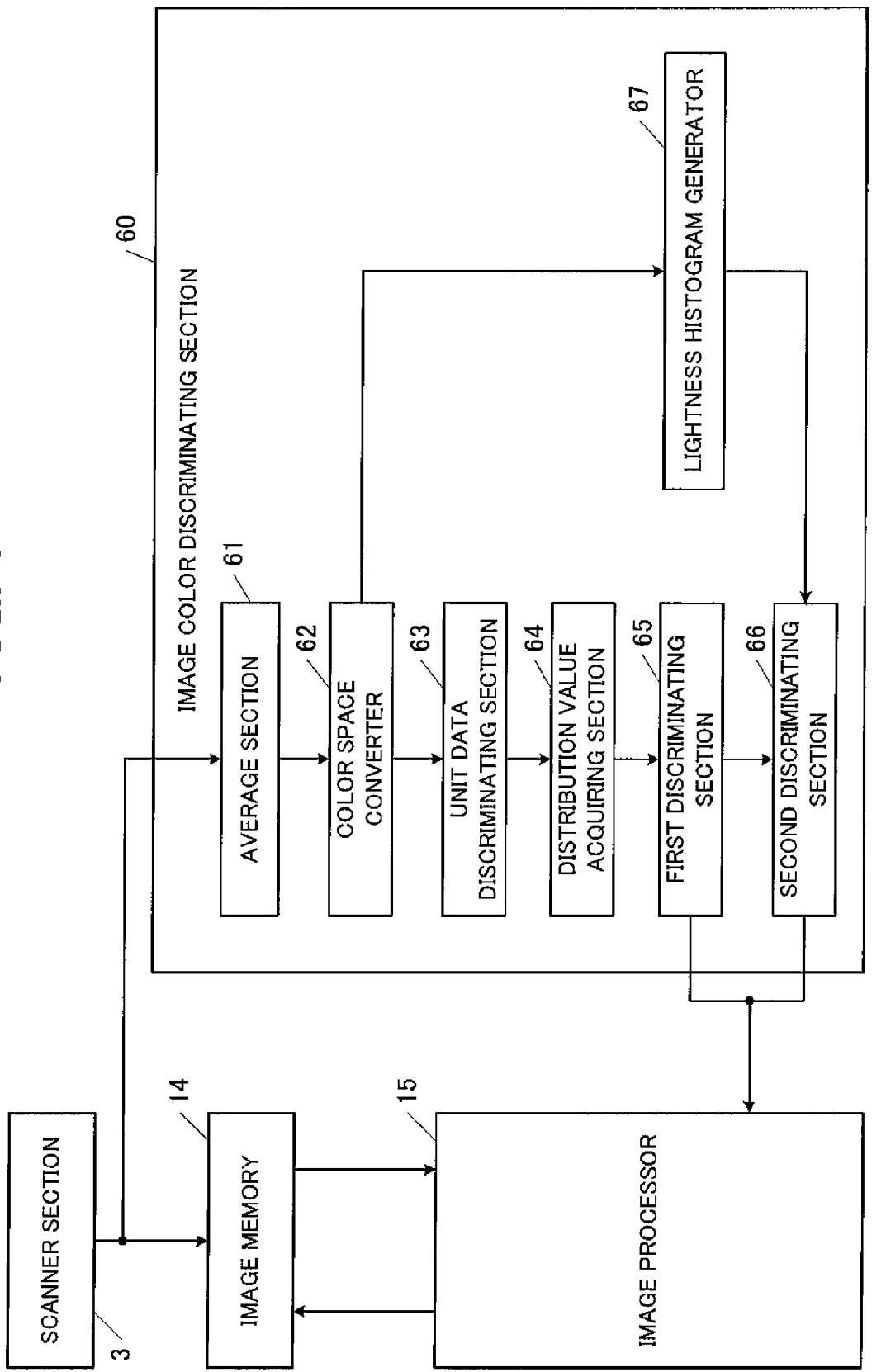
FIG. 7 is a block diagram of a processing section for a scanner function of the multifunction peripheral according to the first embodiment.

FIG. 7 is a block diagram of the processor related to the operation of the scanner function of the multifunction peripheral 1. FIG. 7 schematically shows an image color discriminating section 60 as a processor for processing the function realized by software, by performing arithmetic process by the CPU 11 in accordance with the program 90.

When the scanner function is executed, the scanner section 3 first reads the content of a document by scanning an entire body of the document, and acquires a document image. The acquired document image is recorded in the image memory 14. Each pixel of this document image is expressed by RGB.

The document image recorded in the image memory 14 is inputted into the image processor 15 and subjected to prescribed image processing. Thus, the document image is converted into an image file and again recorded in the image memory 14. The image processor 15 subjects the document image to image processing as needed such as color space conversion, binarization, image compression and file format conversion.

RGB, YCC, Lab, CMYK and the like are examples of color spaces used in image filing. Dither and error diffusion systems are examples of binary systems. JPEG and MMR systems are examples of image compression systems. JPG, TIFF and PDF are examples of file formats of image files.

The image processing performed and the processing performed in the image processing (the color space, binary system, image compression system and file format adopted) is changed according to the kind of document image to be processed. For example, for a full color image, YCC is adopted as the color space, JPEG is adopted as the image compression system, JPG is adopted as the file format, and no binary processing is applied. For a specific color image, RGB is adopted as the color space (for each layer), dither is adopted as the binary system, MMR is adopted as the image compression system, and PDF is adopted as the file format. For a gray-scale image, YCC is adopted as the color space, JPEG is adopted as the image compression system, JPG is adopted as the file format and no binary processing is applied. For a monochromatic image, Lab is adopted as the color space, error diffusion is adopted as the binary system, MMR is adopted as the image compression system and TIFF is adopted as the file format.

Image color discriminating section 60 discriminates the kind of document image. The document image obtained by the scanner section 3 is inputted to the image memory 14 and to the image color discriminating section 60. The image color discriminating section 60 processes the inputted document image and discriminates whether it is a full color, specific color, gray-scale or monochromatic image. The discrimination result is inputted to the image processor 15.

As shown in FIG. 7, the image color discriminating section 60 includes an average section 61, a color space converter 62, a unit data discriminating section 63, a distribution value acquiring section 64, a first discriminating section 65, a second discriminating section 66, and a lightness histogram generator 67. These sections realize the processing for discriminating the kind of document image.

1-4. Image Color Discrimination Processing

Figure 8:
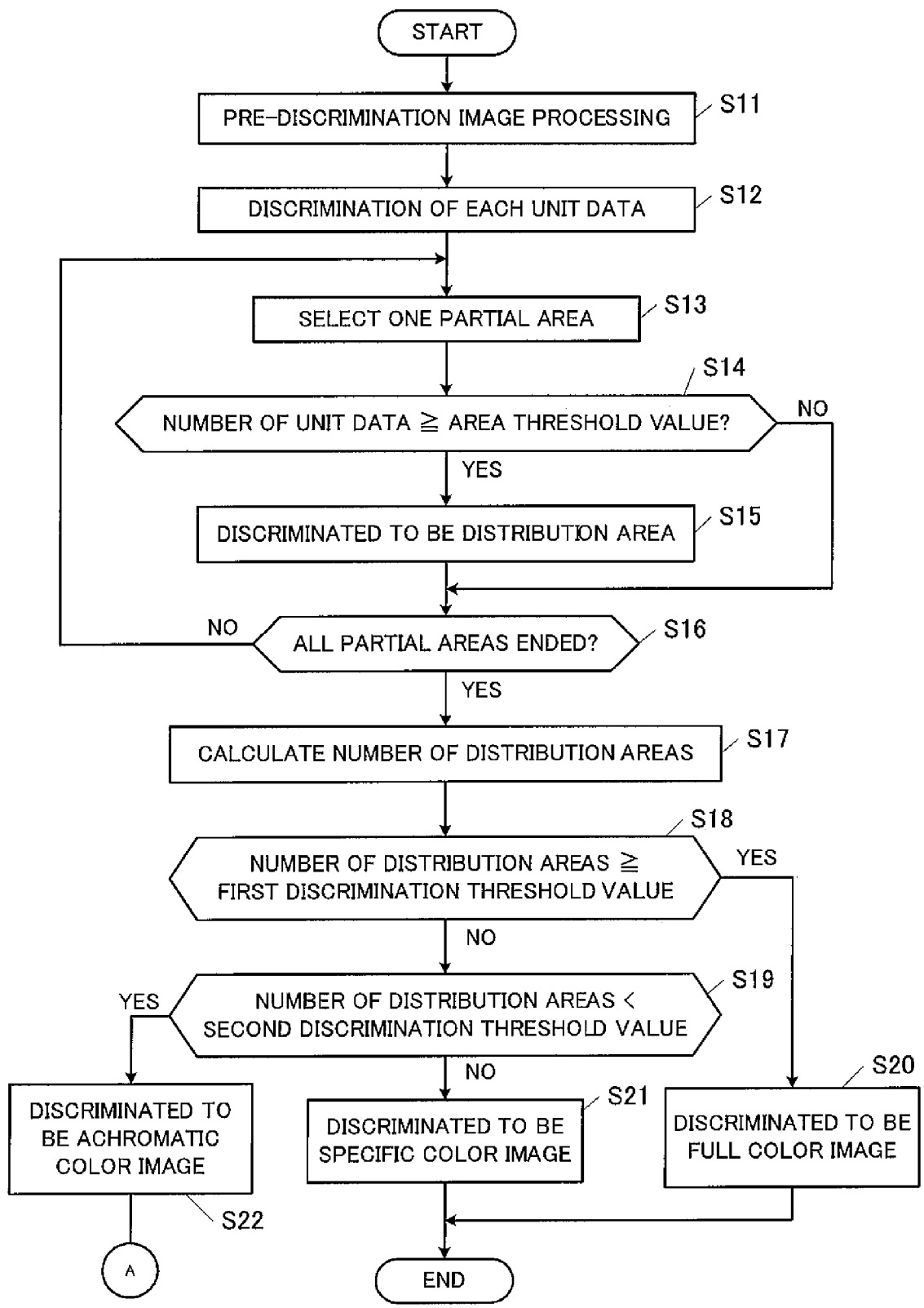
FIG. 8 is a flowchart of image color discrimination processing according to the first embodiment.
Figure 9:
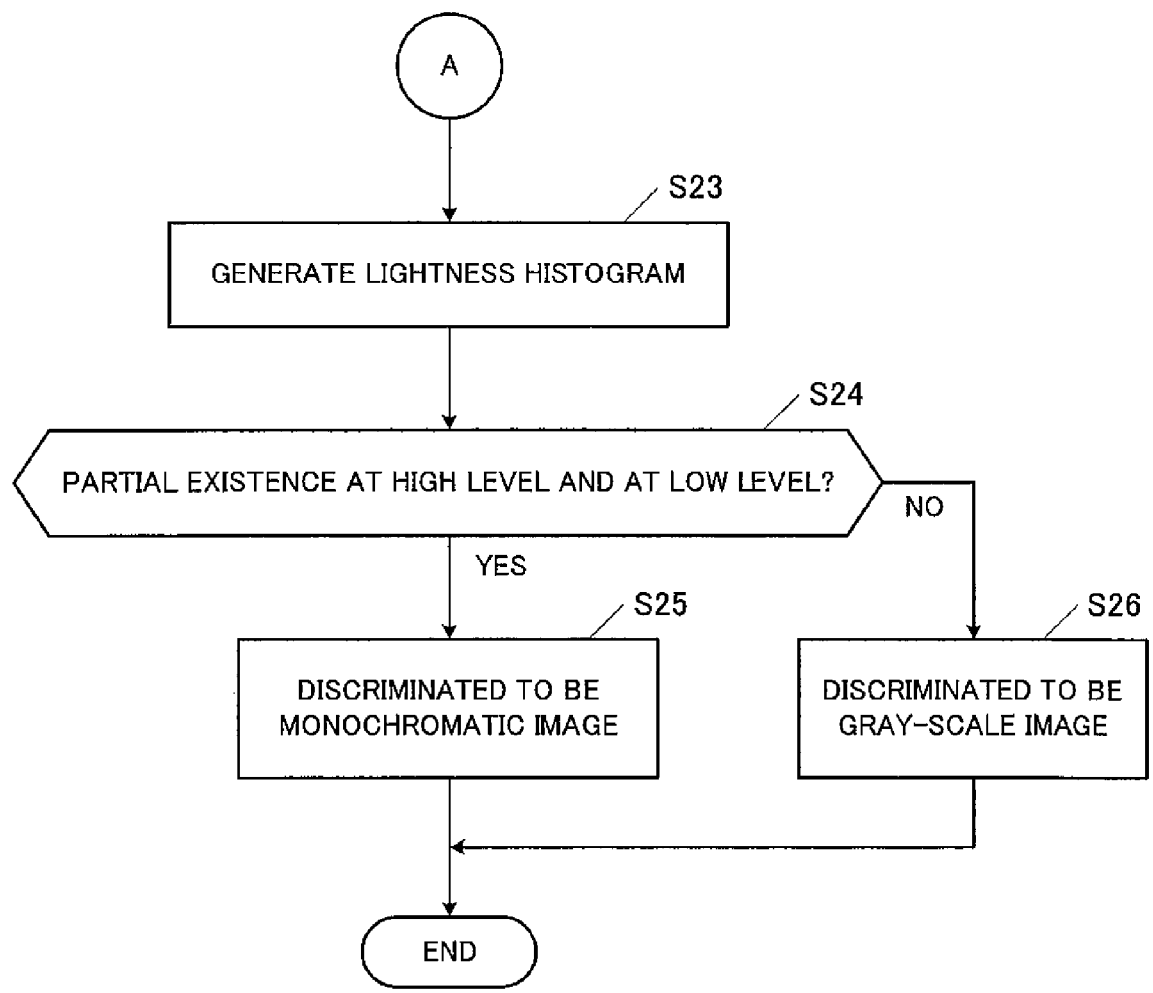
FIG. 9 is a flowchart of image color discrimination processing according to the first embodiment.

FIGS. 8 and 9 illustrate the flow of image color discrimination processing. The flow of image color discrimination processing for discriminating the kind of object image to be processed (that is, the document image in this case) is now described with reference to FIGS. 7-9.

Pre-discrimination processing is first performed in step S11 before discriminating the kind of document image. In step S11, average processing by the average section 61 and color space conversion processing by the color space converter 62 are applied to the document image.

In the average section 61, four adjacent pixels of length (sub-scanning direction) 2× breadth (main-scanning direction) 2 in the document image are defined as one pixel set. Then, values of the pixels in all pixel sets included in the document image are averaged. The average value obtained for each pixel set, called "unit data" hereunder, is defined as an element of a unit showing one color of a part of the document image. The unit data is the average of the values of the pixels expressed by RGB, and therefore is expressed by RGB. Note that the pixel of the document image may also be used as it is as the unit data showing one color of each part of the document image, without performing the aforementioned average processing. After average processing, the document image is subjected to color space conversion processing by the color space converter 62, in which the value of each unit data is, for example, converted to Lab (lightness L and chromaticity a and b) from RGB.

After pre-discrimination processing, the unit data discriminating section 63 discriminates whether each unit data of the document image corresponds to any position of a two-dimensional color plane (step S12).

Figure 10:
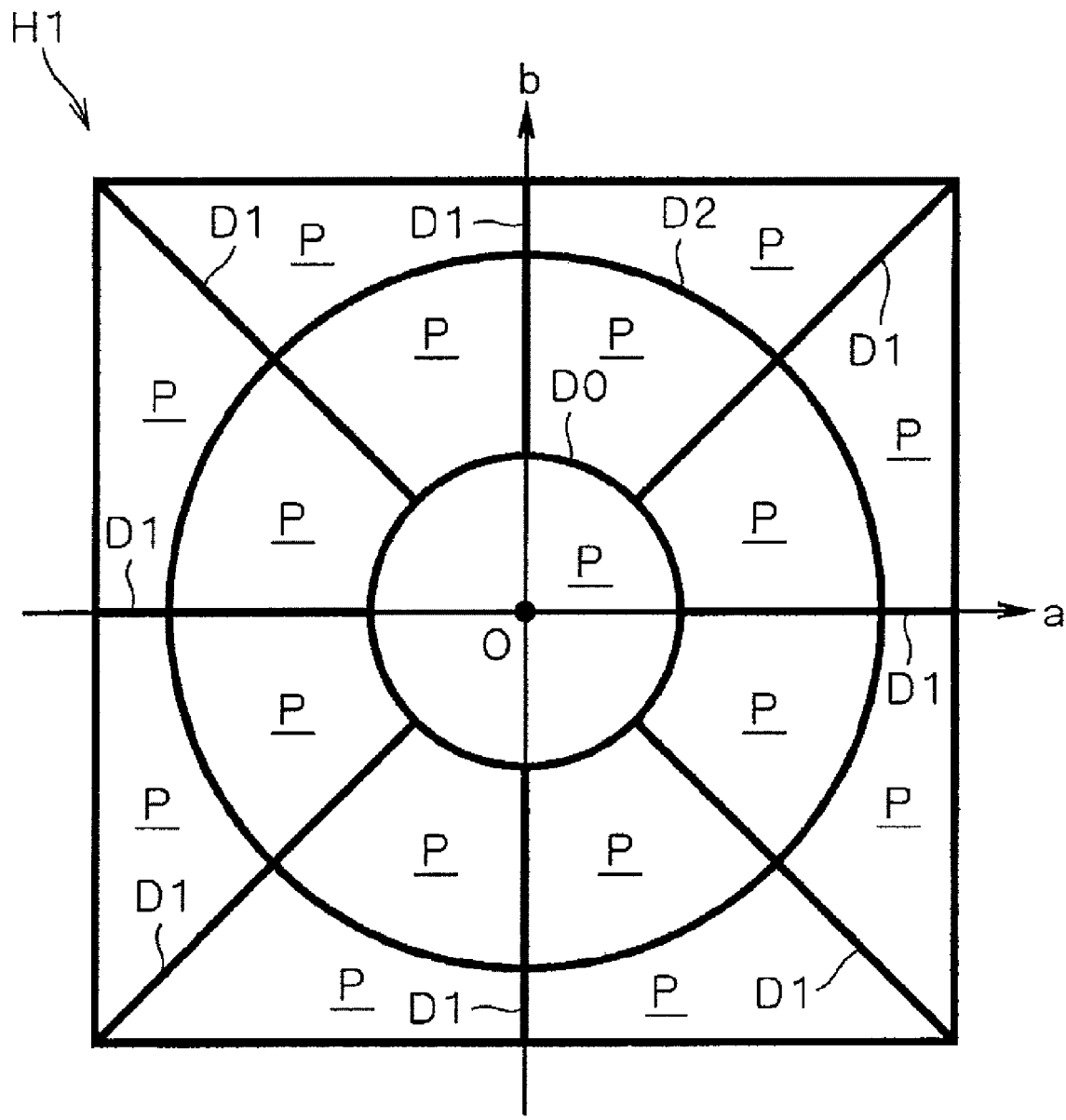
FIG. 10 is a diagram of an exemplary color plane.

FIG. 10 is one example of a color plane H1 used at this time. Similar to color plane H of FIGS. 1-4, color plane H1 corresponds to the chromaticity diagram of the Lab colormetric system. As shown in FIG. 10, the color plane H1 is regarded as a square-shaped area, with the original point O as a center. This area is divided by a plurality of partial areas P by boundary lines D0, D1 and D2. Data showing the color plane H1 and the position of the boundary lines D0, D1, D2 is previously stored in the ROM 12 and the RAM 13.

Circular boundary line D0, in the vicinity of and having the original point O as a center, is a boundary between chromatic color and achromatic color. The inside of boundary line D0 is an achromatic color area that is set as one partial area P. The outside of boundary line D0 is a chromatic color area divided by a plurality of boundary lines D1 radially extending from the original point O and a circular boundary line D2 around the original point O. Sixteen partial areas P are set in the chromatic color area. Accordingly, seventeen partial areas P in total are set in the color plane H1.

Whether the unit data included in the document image corresponds to any coordinate position on the color plane H1 is discriminated based on its color (namely, Lab value, being the value of the unit data). Thus, whether the unit data belongs to any of the partial areas P is discriminated. Thus, whether the unit data belongs to any partial plane H1 is discriminated. Such a discrimination is performed for all unit data included in the document image.

When discrimination of each unit data is complete, steps S13-S17 are performed by the distribution value acquiring section 64, and the distribution range of the unit data in the color plane H1 (distribution range of positions corresponding to the unit data) is acquired.

In step S13, one partial area P is selected from the plurality of partial areas P included in the color plane H1 as a target area.

Next, based on the discrimination result by the unit data discriminating section 63, the number of unit data belonging to the target area is calculated. Then, in step S14, the number of derived unit data is compared to a prescribed threshold value (hereinafter referred to as "area threshold value"). The area threshold value is preferably 2 or more, and is previously stored in the ROM 12 and the RAM 13.

When the number of unit data is the area threshold value or more (Yes in step S14), the target area is discriminated to be an area in which the unit data is distributed (hereinafter referred to as "distribution area") (step S15). Meanwhile, when the number of the unit data is under the area threshold value (No in step S14), the target area is discriminated not to be an area in which the unit data is distributed.

After discriminating whether a target area is a distribution area, step S16 determines whether there are any non-discriminated partial areas P. When a non-discriminated partial area P exists (No in step S16), the next target area is discriminated (step S13), and whether this next target area is a distribution area is determined in steps S14-S15. This processing is repeated until all partial areas P in the color plane H1 have been discriminated to be or not to be distribution areas.

Without performing such processing, when at least one unit data belongs to a partial area P, this partial area may be set as a distribution area. However, in the processing thereafter, the distribution value is acquired only by calculating the distribution area as a target. When a partial area is discriminated to be an area in which unit data of the number of the area threshold value or more exists, as described above, and only such partial areas are set as distribution areas (namely, calculation targets), and partial areas to which a slight amount of unit data happens to belong under an influence of noise, etc., are excluded from processing. Accordingly, by discriminating whether or not an area is a distribution area based on an area threshold value, the influence of noise, etc., can be eliminated, and accuracy of discriminating the kind of image is improved.

After discriminating whether or not all partial areas P in the color plane H1 are distribution areas, in step S17, the number of distribution areas included in the color plane H1 (hereinafter referred to as "distribution area number") is calculated by the distribution value acquiring section 64. This distribution area number can be considered as the distribution value showing the width of the distribution range of the unit data in the color plane H1.

The acquired distribution area number is compared in steps S18 and S19 to first and second discrimination threshold values by the first discriminating section 65. The second discrimination threshold value, such as 2, is smaller than the first discrimination threshold value, such as 10. The first and second discrimination values are previously stored in the ROM 12 and the RAM 13, or the like.

When the number of distribution areas is the first discrimination threshold value or more (Yes in step S18), the distribution range of the unit data is relatively wider. Therefore, the first discriminating section 65 discriminates the document image to be a full color image (step S20).

Meanwhile, if the number of distribution areas is less than the first discrimination threshold value (No in Step S18), but not less than the second discrimination threshold value (No in step S19), there is a high possibility of impartial distribution range of the unit data. Therefore, the first discriminating section 65 discriminates the document image to be a specific color image (step S21).

In addition, when the number of distribution areas is under both discrimination threshold values (Yes in step S19), the distribution range of the unit data is relatively narrower. Therefore, the first discriminating section 65 discriminates the document image to be an achromatic color image (step S22).

When the document image is an achromatic color image, the first discriminating section 65 further discriminates whether the document image is a gray-scale image or a monochromatic image (FIG. 9).

First, all values of the unit data (Lab values showing the color) of the document image are inputted in the lightness histogram generator 67 from the color space converter 62. Based on the values of this unit data, the lightness histogram generator generates in step S23 a histogram of lightness L, which is a parameter of brightness, (hereinafter referred to as "lightness histogram").

Then, based on this lightness histogram, the second discriminating section 66 discriminates whether the document image is a gray-scale image or a monochromatic image (steps S24-S26).

Figure 11:
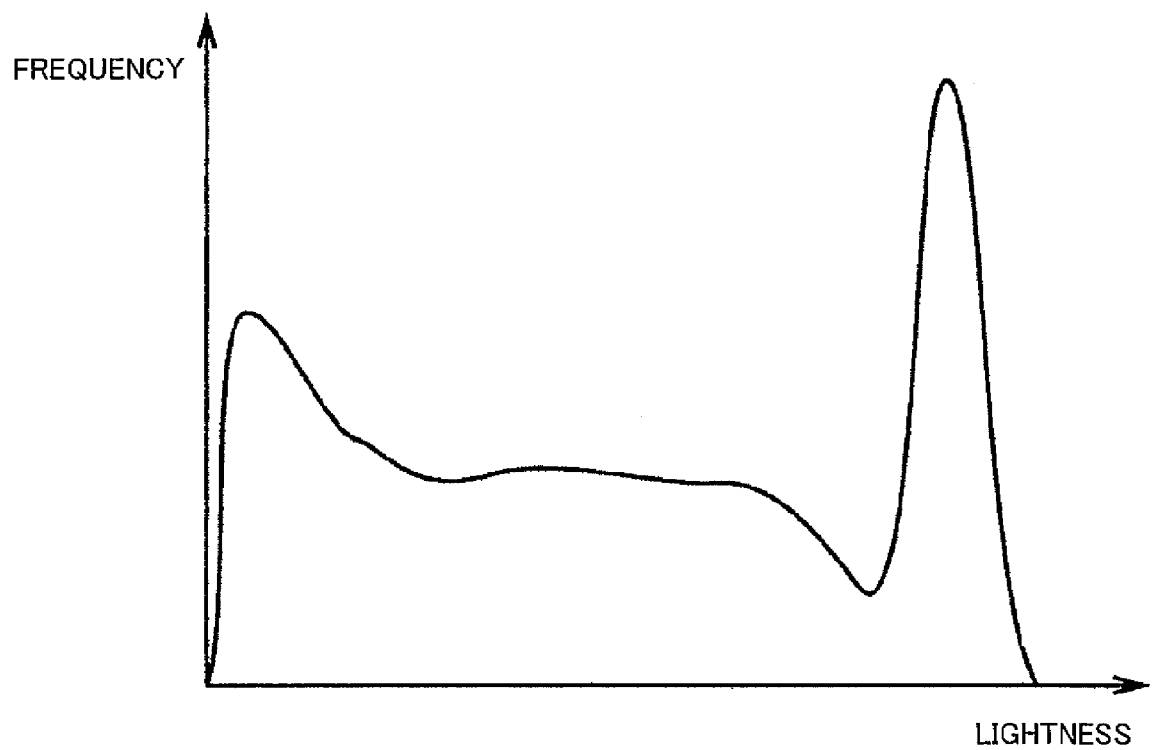
FIG. 11 is an exemplary lightness histogram of a gray-scale image.
Figure 12:
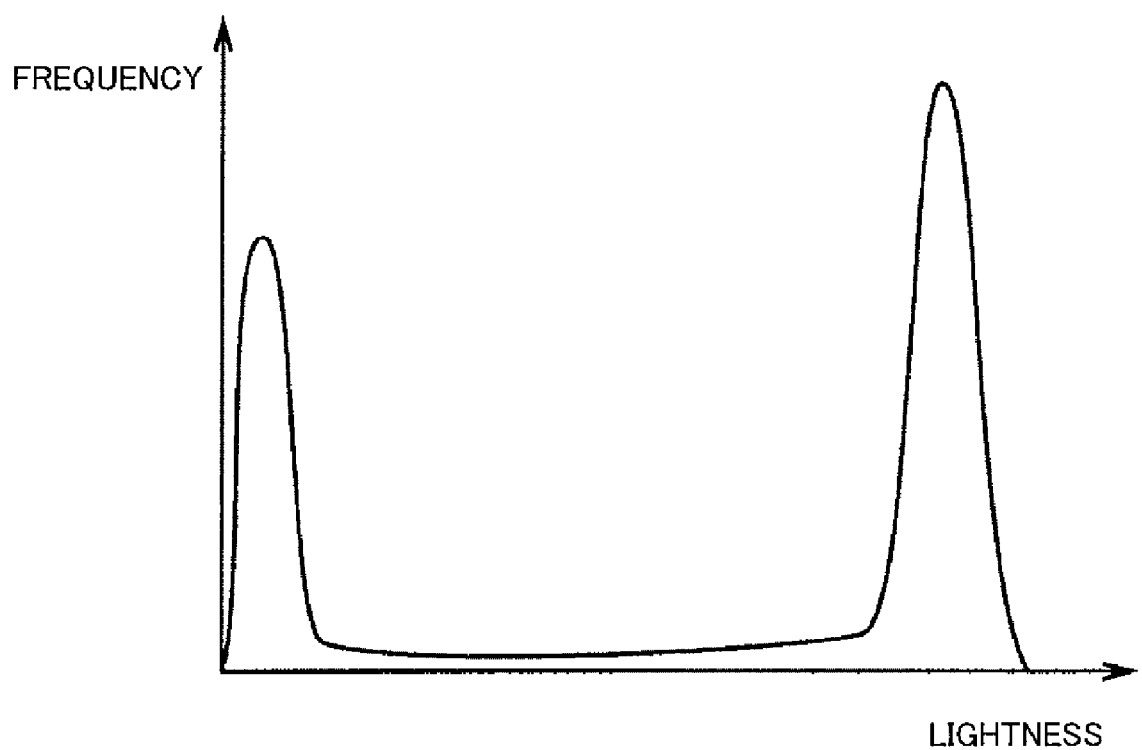
FIG. 12 is an exemplary lightness histogram of a monochromatic image.

FIGS. 11 and 12 are examples of lightness histograms. FIG. 11 is a lightness histogram of a gray-scale image, and FIG. 12 is a lightness histogram of a monochromatic image. As shown in FIG. 11, in the lightness histogram of a gray-scale image, there are frequencies over the entire range of lightness from a low level to a high level. Meanwhile, as shown in FIG. 12, in the lightness histogram of a monochromatic image, almost all frequencies partially exist at the low level and at the high level of lightness, with little frequency existing at an intermediate level of lightness.

Therefore, the second discriminating section 66 discriminates in step S24 whether frequencies partially exist at low and high levels in the lightness histogram. Various methods can be adopted in this regard. For example, the total number of frequencies that exist at an intermediate level between the low and high levels may be obtained may be compared to a prescribed threshold value. When the total number of intermediate level frequencies is the threshold value or more, it is determined that frequencies impartially exist, and when it is under the threshold value, it is determined that the frequencies partially exist.

When frequencies partially exist at the low and high levels (Yes in step S24), the second discriminating section 66 discriminates the document image to be a monochromatic image (step S25). Meanwhile, when frequencies do not partially exist at the low and high levels (No in step S24), the second discriminating section 66 discriminates the document image to be a gray-scale image (step S26).

1-5. Conclusion

As described above, in the multifunction peripheral 1, whether each unit data showing the color of each part of a document image corresponds to a position on the two-dimensional color plane H1 is discriminated, and based on the discrimination result, the number of distribution areas is acquired as a distribution value showing the width of the distribution range of the unit data in the color plane H1. Then, based on the number of the distribution areas, it is discriminated whether the document image is a full color image having mixed color expression, a specific color image not having mixed color expression or an achromatic color image. Therefore, is the present invention easily discriminates whether the document image is a full color, specific color or achromatic color image.

In addition, when the document image is discriminated to be an achromatic color image, based on a lightness histogram, the document image is discriminated as either a gray-scale image having tone expression or a monochromatic image not having tone expression. Therefore, when the document image is an achromatic color image, its property is discriminated in further detail.

2. Second Embodiment

A second embodiment of the invention is now explained. The structure and operation of the multifunction peripheral 1 according to the second embodiment are approximately the same as those of the first embodiment, and therefore the following explanation centers on differences between the first and second embodiments. According to the first embodiment, when the number of the distribution areas is not less than the second discrimination threshold value and under the first discrimination threshold value, the document image is discriminated to be a specific color image. However, when a full color image includes mixed color expression of a small amount of color, there is a possibility that the distribution range of its unit data is relatively narrower. Therefore, according to the second embodiment, when the number of distribution areas is not less than the second discrimination threshold value and under the first discrimination threshold value, and in consideration of further elements, whether the document image is a specific color image or a full color image is more accurately discriminated.

Figure 13:
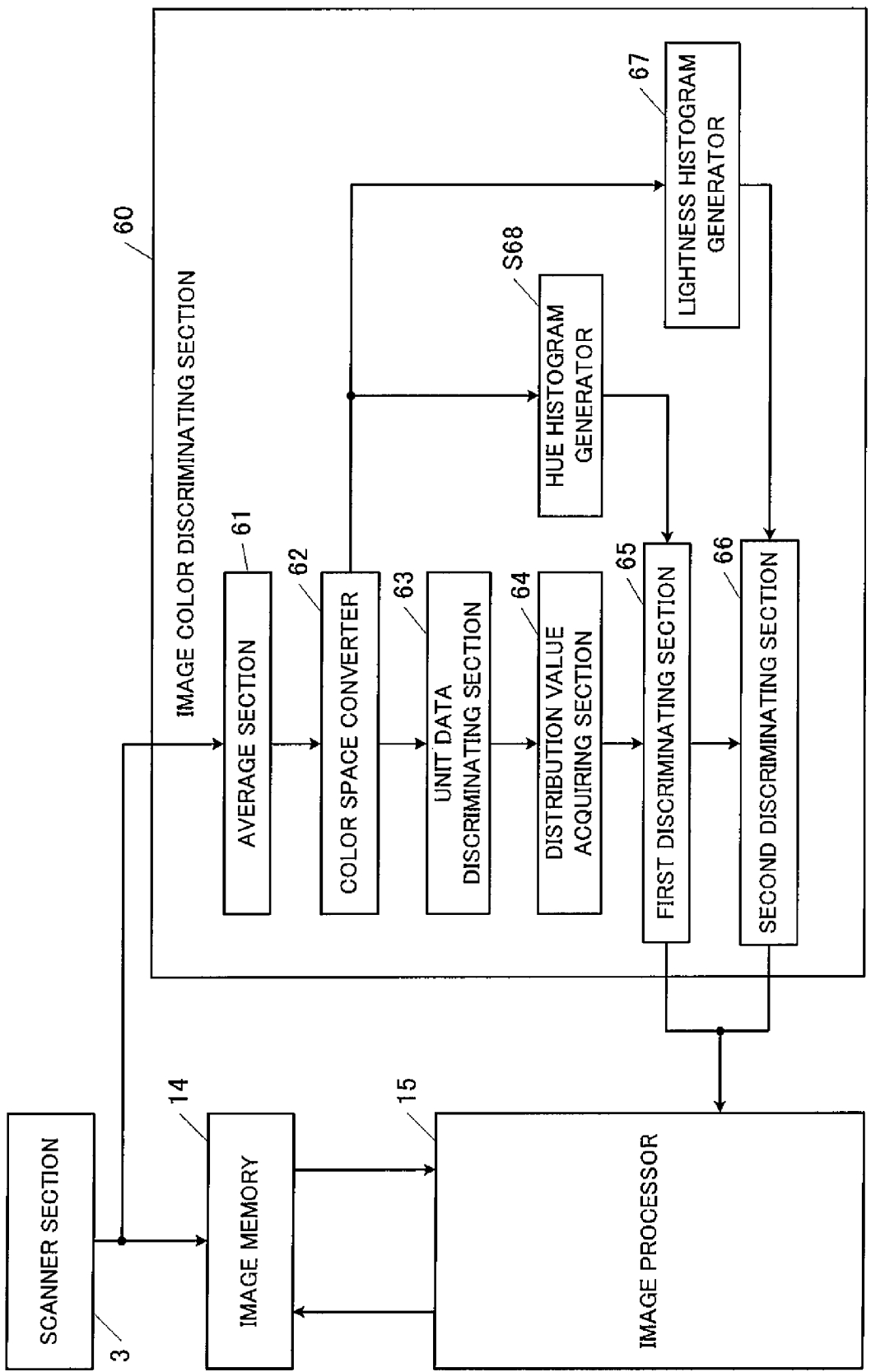
FIG. 13 is a block diagram of a processing section for a scanner function of the multifunction peripheral according to a second embodiment of the invention.

FIG. 13 is a block diagram of a processor related to operation of a scanner function of the multifunction peripheral 1 according to the second embodiment. As seen in FIG. 13, if compared to FIG. 7, the image color discriminating section 60 of the second embodiment includes a hue histogram generator 68 in addition to the elements of the first embodiment.

Figure 14:
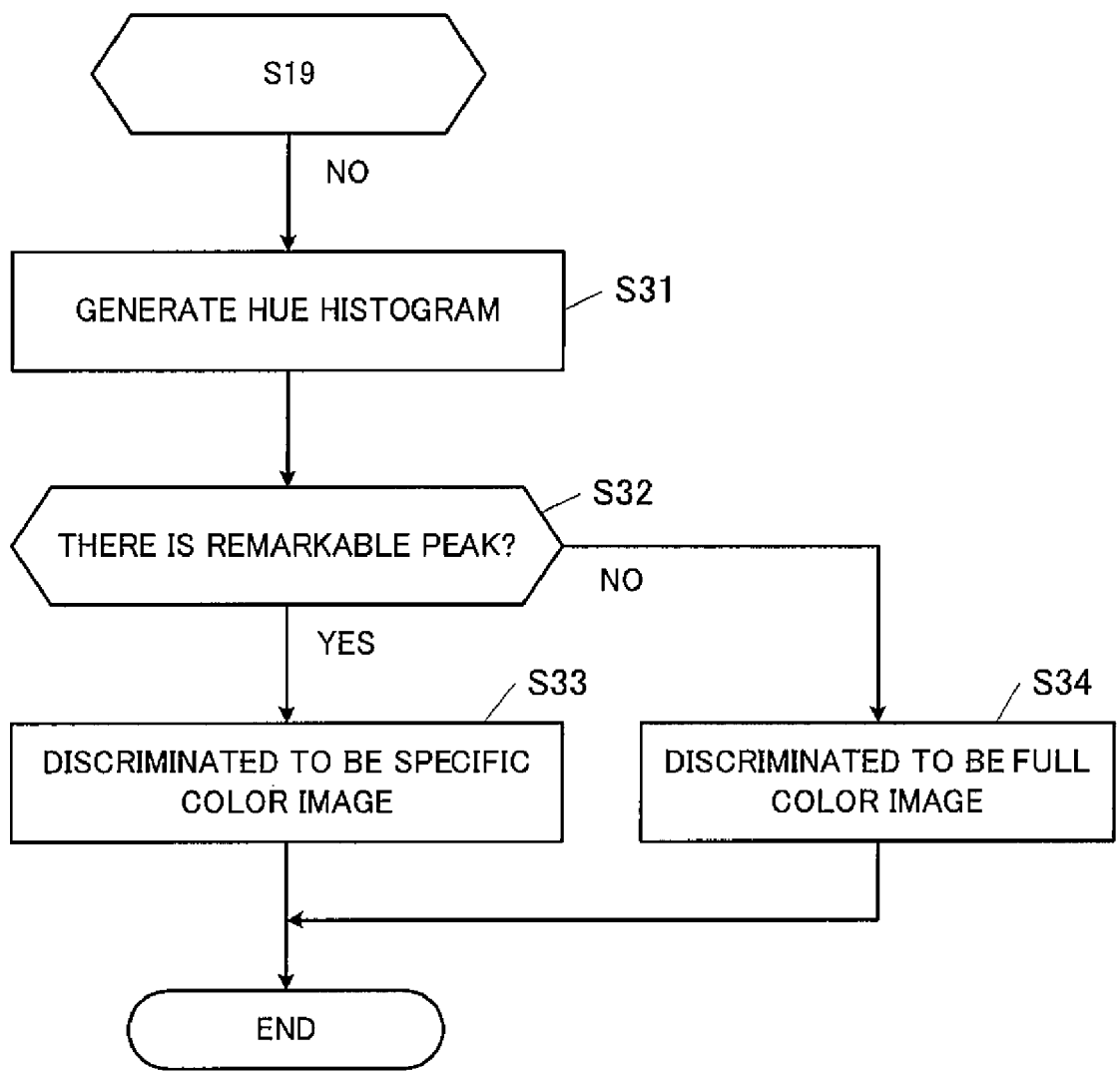
FIG. 14 is a partial flowchart of image color discrimination processing according to the second embodiment.

The image color discrimination processing of the second embodiment is similar to that of the first embodiment shown in FIGS. 8 and 9. However, in a case of No in step S19 (when the number of distribution areas is not less than the second discrimination threshold value and under the first discrimination threshold value), the processing thereafter is different than in the first embodiment. FIG. 14 shows the flow of processing in a case of No in step S19.

First, all values of the unit data of the document image (Lab value showing the color) are inputted in the hue histogram generator 68 from the color space converter 62. Based on the values of the unit data, a histogram of hue (hereinafter referred to as "hue histogram") is generated by the hue histogram generator 68. The hue can be easily acquired from the chromaticity a and b by a publicly-known conversion expression (step S31).

Based on the hue histogram, the first discriminating section 65 discriminates whether the document image is a full color image or a specific color image (Steps S32-S34).

Figure 15:
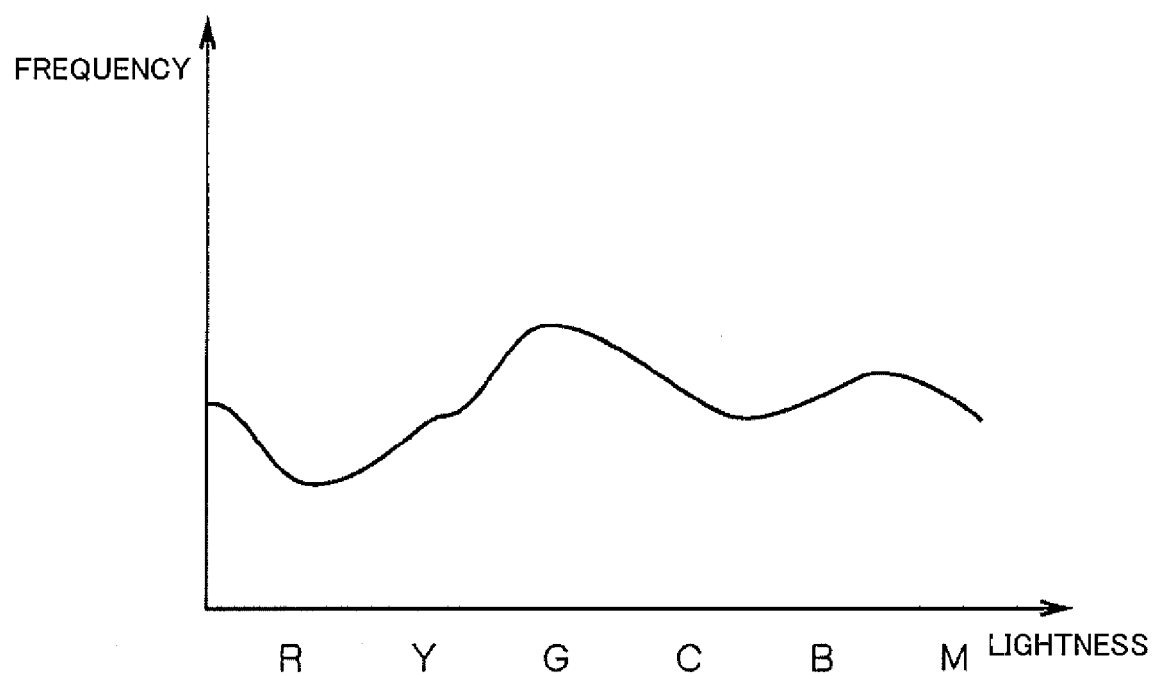
FIG. 15 is an exemplary lightness histogram of a full color image.
Figure 16:
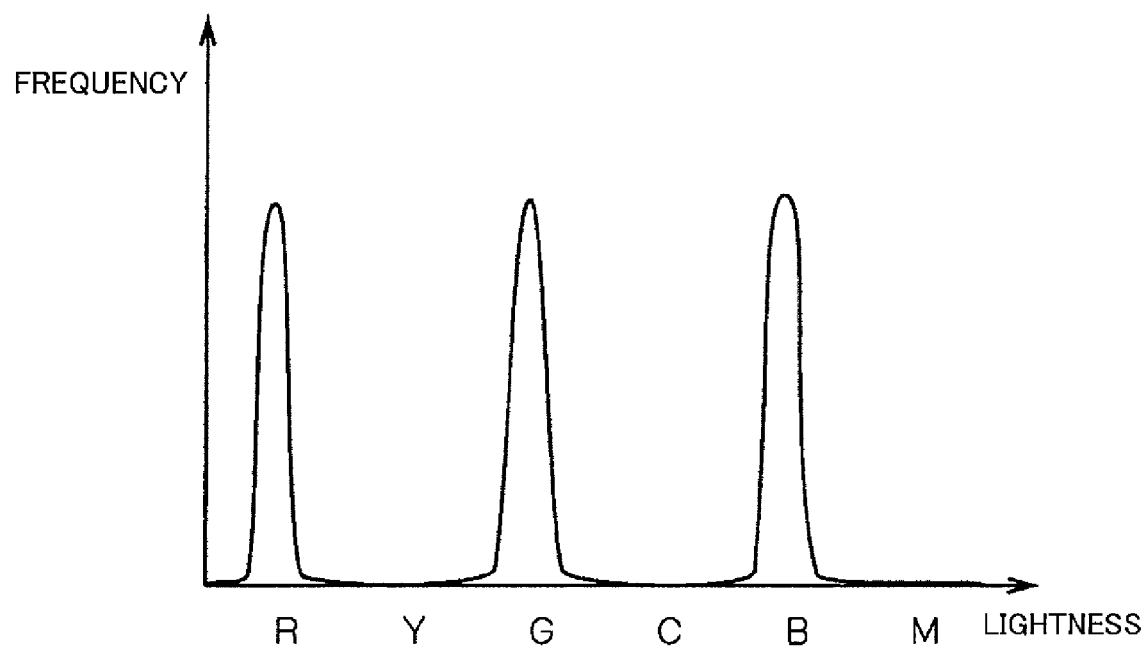
FIG. 16 is an exemplary lightness histogram of a specific color image.

FIGS. 15 and 16 are examples of hue histograms. FIG. 15 is a hue histogram of a full color image, and FIG. 16 is a hue histogram of a specific color image. As shown in FIG. 15, in the hue histogram of a full color image, frequencies exist over various kinds of hues with no remarkable peak. Meanwhile, as shown in FIG. 16, in the hue histogram of a specific color image, frequencies exist only in hues corresponding to specific colors (such as R, G, B in the example of FIG. 6), with remarkable peaks at positions of these hues.

Therefore, the first discriminating section 65 discriminates whether or not there is a remarkable peak in the hue histogram (step S32). Various methods can be adopted in this discrimination. For example, a difference in positions of adjacent hues may be taken, and whether or not a differential value thus obtained is a prescribed threshold value or more can be discriminated. When the differential value is the threshold value or more, a remarkable peak exists, and when it is under the threshold value, there is no remarkable peak.

When a remarkable peak exists (Yes in step S32), the first discriminating section 65 discriminates the document image to be a specific color image (step S33). Meanwhile, when no remarkable peak exists (No in step S32), the first discriminating section 65 discriminates the document image to be a full color image (step S34).

Thus, according to the second embodiment, when the number of distribution areas is not less than the second discrimination threshold value and under the first discrimination threshold value, based on a hue histogram, the document image is discriminated to be either a full color image or a specific color image. Therefore, a specific color image is accurately discriminated.

3. Other Embodiments

While embodiments of the present invention have been explained, the invention is not limited to these embodiments, and various modifications are possible. Examples of such other embodiments are now explained. The embodiments explained hereunder may of course be suitably combined.

In the first embodiment, after the unit data discriminating section 63 discriminates whether each unit data of the document image corresponds to a position on the color plane, a histogram of lightness L of each unit data is generated by the lightness histogram generator 67 (see FIG. 8 and FIG. 9). However, the present invention is not limited thereto. For example, the discrimination processing of the unit data by the unit data discriminating section 63 and the generation of the lightness histogram by the lightness histogram generator 67 may be executed in parallel.

In the second embodiment, after the unit data discriminating section 63 executes discrimination processing of the unit data, the lightness histogram generator 67 generates the lightness histogram and the hue histogram generator 68 generates the hue histogram. However, the present invention is not limited thereto. For example, the discrimination processing of the unit data and the generation of the lightness and hue histograms may be executed in parallel.

In the above-described embodiments, the number of distribution areas is adopted as a distribution value showing the width of the distribution range of the unit data in the color plane. However, the total area of the distribution areas may be adopted. In any case, the width of the distribution range of the unit data in the color plane can be easily acquired.

Figure 17:
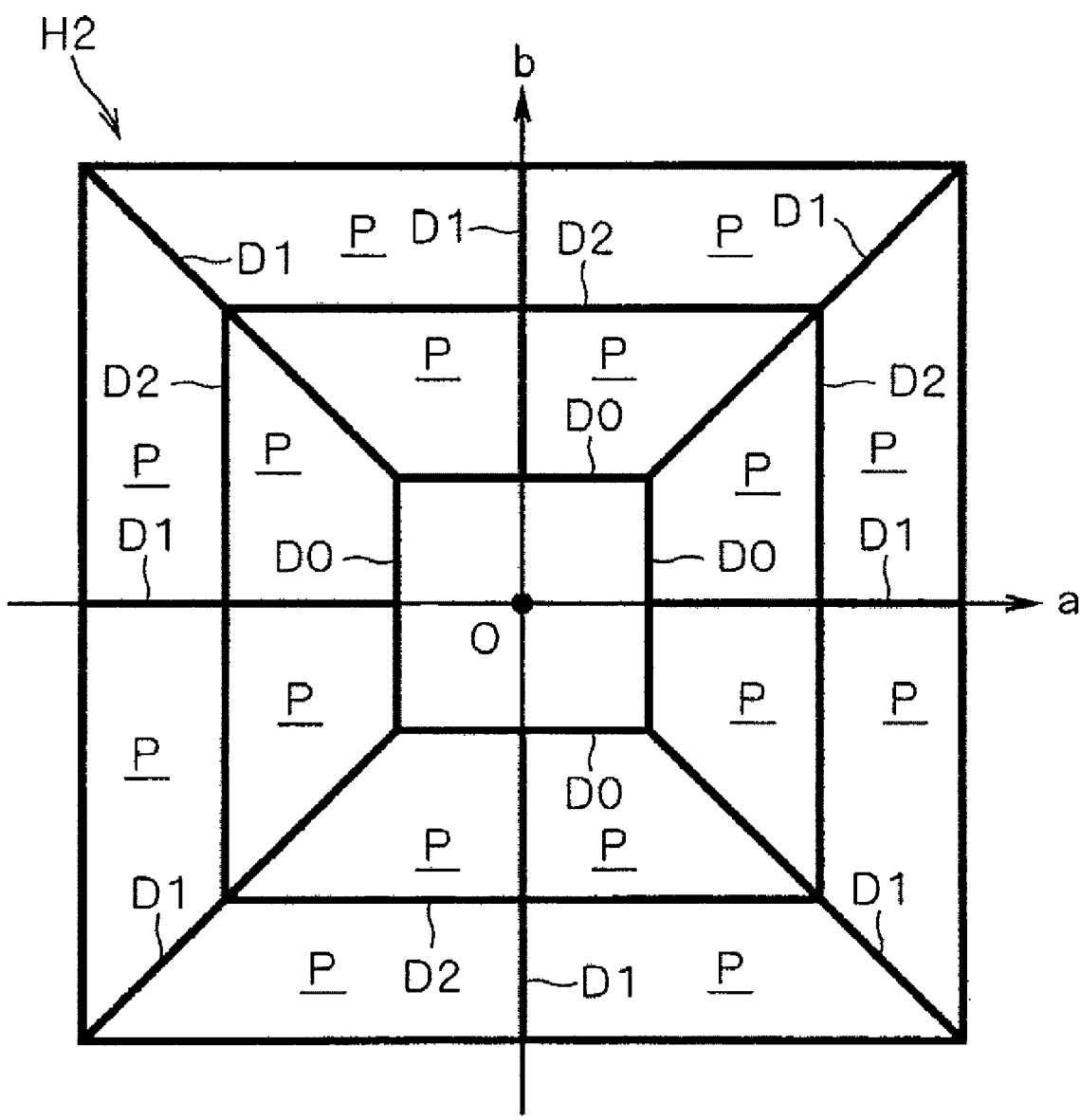
FIG. 17 is a diagram of another example of a color plane.
Figure 18:
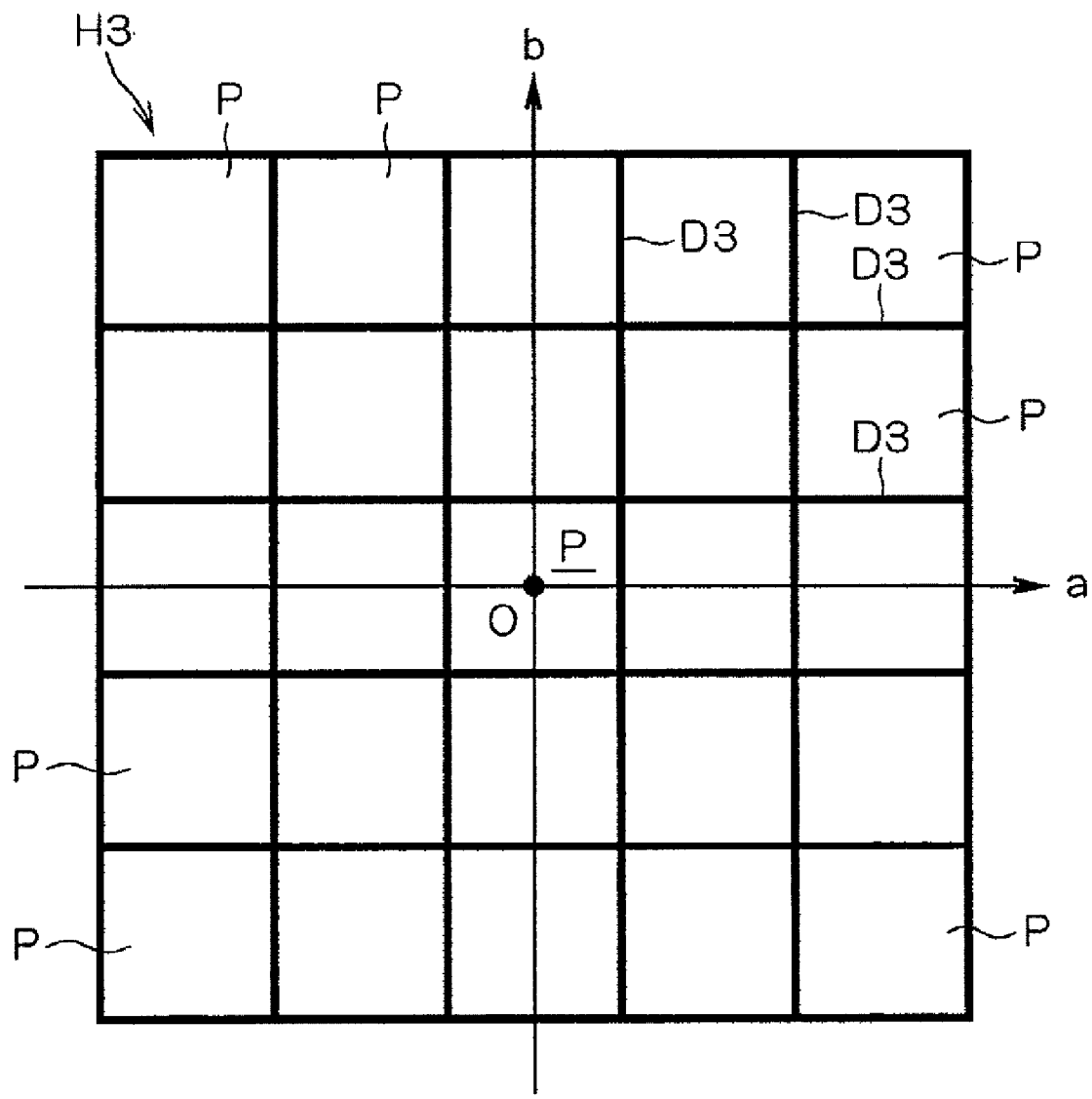
FIG. 18 is a diagram of another example of a color plane.
Figure 19:
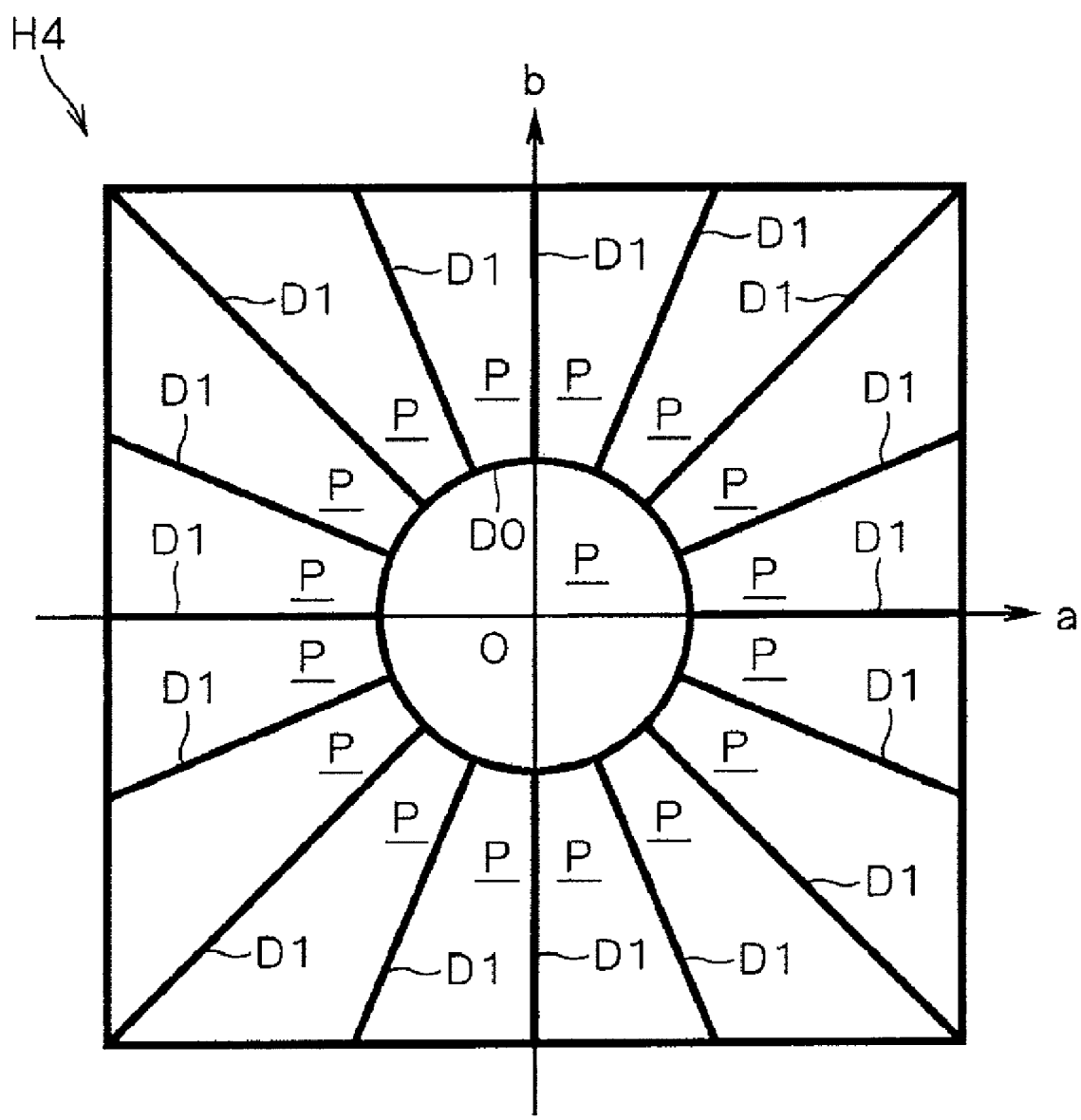
FIG. 19 is a diagram of another example of a color plane.

In addition, the color plane may be divided into a plurality of partial areas P by methods other than that shown in FIG. 10. For example, as shown in color plane H2 of FIG. 17, boundary lines D0 and D2 may be set in parallel to the two coordinate axes rather than being formed in circular shapes. When the boundary lines are thus set, it is possible to simply discriminate whether the unit data belongs to a partial area P by comparing the chromaticity a and b, and the coordinate positions of the boundary lines. In addition, as shown in color plane H3 of FIG. 18, all boundary lines D3 may be set in parallel to the two coordinate axes and an entire area of the color plane H3 may be equally divided. In this case also, whether the unit data belongs to a partial area P is easily discriminated. Further, as shown by color plane H4 of FIG. 19, the chromatic area may be divided only by a plurality of boundary lines D1 radially extending from the original point O. In this case, the number of partial areas obtained by division is relatively increased (such as sixteen or more) and the specific color image can be more accurately discriminated based only on the distribution value, even without taking the hue histogram of the second embodiment into consideration.

In the above-described embodiments, the chromaticity diagram of the Lab colormetric system is adopted as the color plane. However, chromaticity diagrams other than the Lab colormetric system can also be used, provided that the colormetric system has parameters regarding brightness (luminance and lightness), and parameters regarding hue and saturation (color difference and chromaticity) such as YCC, YIQ, and Luv. When a chromaticity diagram of a colormetric system other than the Lab is adopted as the color plane, the value of the unit data may also be converted into the value of this colormetric system. When using a different colormetric system, for example, when luminance is a parameter of brightness, a luminance histogram may be generated as the histogram of the parameter of brightness.

In addition, it is possible to use a color plane with affine transformation such as rotation transformation applied to the chromaticity diagram of a general colormetric system. In this case, similar affine transformation may be applied to the value of the unit data.

In the above-described embodiments, the image processing method regarding the scanner function is changed according to the discrimination result of the kind of document image. The image processing method and print method regarding the copy function may also be changed. For example, the toner used may be changed according to the kind of image.

In addition, in the above description, the multifunction peripheral 1 functions as the image color discriminating apparatus. However, a general-purpose computer apparatus may also function as the image color discriminating apparatus by executing a similar program as that of the aforementioned embodiments.

Also, according to the above-described embodiments, the functions of the image color discriminating section 60 are realized by software and the arithmetic process of the CPU in accordance with the program. However, all or part of these functions may be realized by an electrical hardware circuit.

While the present invention has been described with respect to embodiments thereof, it will be apparent to those skilled in the art that the disclosed invention may be modified in numerous ways and may assume many embodiments other than those specifically set out and described above. Accordingly, the appended claims are intended to cover all modifications that fall within the true spirit and scope of the present invention.

What is claimed is:

1. An image color discriminating apparatus that discriminates a color of an object image, comprising:
   a processor comprising:
      a unit discriminating section that discriminates whether unit data showing a color of a part of the object image corresponds to any position on a two-dimensional color plane;
      a distribution value acquiring section that acquires a distribution value showing a width of a distribution range of the unit data in the color plane, based on a discrimination result obtained by the unit discriminating section;
      an image discriminating section that discriminates based on the distribution value whether the object image corresponds to a full color image having mixed color expression, a specific color image not having mixed color expression or an achromatic color image of achromatic color;
      a lightness histogram generator that generates a histogram of a parameter of brightness, based on a color shown by the unit data; and
      a discriminating section that discriminates whether the object image corresponds to a gray-scale image having tone expression or a monochromatic image not having tone expression, based on the histogram of the parameter of brightness, when the object image is discriminated to be the achromatic color image.

2. The image discriminating apparatus according to claim 1, wherein the image discriminating section discriminates the object image to be the full color image when the distribution value is a prescribed first threshold value or more, and discriminates the object image to be the achromatic color image when the distribution value is under a prescribed second threshold value that is smaller than the first threshold value.

3. The image color discriminating apparatus according to claim 2, wherein the image discriminating section discriminates the object image to be the specific color image, when the distribution value is not less than the second threshold value and under the first threshold value.

4. The image color discriminating apparatus according to claim 2, further comprising a hue histogram generator that generates a histogram of hue, based on a color shown by the unit data, wherein the image discriminating section discriminates whether the object image corresponds to the full color image or the specific color image based on the hue histogram, when the distribution value is not less than the second threshold value and under the first threshold value.

5. The image color discriminating apparatus according to claim 1, wherein the unit discriminating section discriminates whether the unit data belongs to any of a plurality of partial areas obtained by dividing the color plane, and the distribution value acquiring section acquires the number of the partial areas discriminated to be areas to which the unit data belongs, as the distribution value.

6. The image color discriminating apparatus according to claim 2, wherein the unit discriminating section discriminates whether the each unit data belongs to any of a plurality of partial areas obtained by dividing the color plane, and the distribution acquiring section acquires the number of the partial areas discriminated to be the areas to which the unit data belongs, as the distribution value.

7. The image color discriminating apparatus according to claim 3, wherein the unit discriminating section discriminates whether the unit data belongs to any of a plurality of partial areas obtained by dividing the color plane, and the distribution value acquiring section acquires the number of the partial areas discriminated to be the areas to which the unit data belongs, as the distribution value.

8. The image color discriminating apparatus according to claim 4, wherein the unit discriminating section discriminates whether the unit data belongs to any of a plurality of partial areas obtained by dividing the color plane, and the distribution value acquiring section acquires the number of the partial areas discriminated to be the areas to which the unit data belongs, as the distribution value.

9. The image color discriminating apparatus according to claim 1, wherein the unit discriminating section discriminates whether the unit data belongs to any of a plurality of partial areas obtained by dividing the color plane, and the distribution value acquiring section acquires a total area of the partial areas discriminated to be the areas to which the unit data belongs, as the distribution value.

10. The image color discriminating apparatus according to claim 2, wherein the unit discriminating section discriminates whether the unit data belongs to any of a plurality of partial areas obtained by dividing the color plane, and the distribution value acquiring section acquires a total area of the partial areas discriminated to be the areas to which the unit data belongs, as the distribution value.

11. The image color discriminating apparatus according to claim 3, wherein the unit discriminating section discriminates whether the unit data belongs to any of a plurality of partial areas obtained by dividing the color plane, and the distribution value acquiring section acquires a total area of the partial areas discriminated to be the areas to which the unit data belongs, as the distribution value.

12. The image color discriminating apparatus according to claim 4, wherein the unit discriminating section discriminates whether the unit data belongs to any of a plurality of partial areas obtained by dividing the color plane, and the distribution value acquiring section acquires a total area of the partial areas discriminated to be the areas to which the unit data belongs, as the distribution value.

13. The image color discriminating apparatus according to claim 5, wherein the distribution value acquiring section acquires distribution values only for partial areas having a number of unit data equaling or exceeding a prescribed threshold value.

14. The image color discriminating apparatus according to claim 6, wherein the distribution value acquiring section acquires distribution values only for partial areas having a number of unit data equaling or exceeding a prescribed threshold value.

15. The image color discriminating apparatus according to claim 7, wherein the distribution value acquiring section acquires distribution values only for partial areas having a number of unit data equaling or exceeding a prescribed threshold value.

16. The image color discriminating apparatus according to claim 8, wherein the distribution value acquiring section acquires distribution values only for partial areas having a number of unit data equaling or exceeding a prescribed threshold value.

17. The image color discriminating apparatus according to claim 9, wherein the distribution value acquiring section acquires distribution values only for partial areas having a number of unit data equaling or exceeding a prescribed threshold value.

18. The image color discriminating apparatus according to claim 10, wherein the distribution value acquiring section acquires distribution values only for partial areas having a number of unit data equaling or exceeding a prescribed threshold value.

19. The image color discriminating apparatus according to claim 11, wherein the distribution value acquiring section acquires distribution values only for partial areas having a number of unit data equaling or exceeding a prescribed threshold value.

20. The image color discriminating apparatus according to claim 12, wherein the distribution value acquiring section acquires distribution values only for partial areas having a number of unit data equaling or exceeding a prescribed threshold value.

21. An image color discriminating method for discriminating a color of an object image, comprising executing with a processor the steps of:
(a) discriminating whether unit data showing a color of a part of the object image corresponds to any position on a two-dimensional color plane;
(b) acquiring a distribution value showing a width of a distribution range of the unit data in the color plane, based on a discrimination result obtained in step (a);
(c) discriminating based on the distribution value whether the object image corresponds to a full color image having mixed color expression, a specific color image not having mixed color expression or an achromatic color image;
(d) generating a histogram of a parameter of brightness, based on a color shown by the unit data; and
(e) discriminating whether the object image corresponds to a gray-scale image having tone expression or a monochromatic image not having tone expression, based on the histogram of the parameter of brightness, when the object image is discriminated to be the achromatic color image.

22. A program embodied in a non-transitory computer-readable medium for discriminating a color of an object image, to cause a computer to execute the steps of:
(a) discriminating whether unit data showing a color of a part of the object image corresponds to any position in a two-dimensional color plane;
(b) acquiring a distribution value showing a width of a distribution range of the unit data in the color plane, based on a discrimination result of the step (a);
(c) discriminating based on the distribution value whether the object image corresponds to a full color image having mixed color expression, a specific color image not having mixed color expression or an achromatic color image;
(d) generating a histogram of a parameter of brightness, based on a color shown by the unit data; and
(e) discriminating whether the object image corresponds to a gray-scale image having tone expression or a monochromatic image not having tone expression, based on the histogram of the parameter of brightness, when the object image is discriminated to be the achromatic color image.

* * * * *